United States Patent [19]
Ellis

[11] Patent Number: 4,910,035
[45] Date of Patent: Mar. 20, 1990

[54] PROCESS AND PRODUCT FOR MAKING FLAVORED MILK

[75] Inventor: Larry D. Ellis, St. Louis County, Mo.

[73] Assignee: Consolidated Flavor Corporation, Bridgeton, Mo.

[21] Appl. No.: 320,774

[22] Filed: Mar. 8, 1989

[51] Int. Cl.[4] .................. A23G 1/00; A23C 1/154; A23C 1/156; A23L 1/04

[52] U.S. Cl. ................... 426/584; 426/573; 426/593

[58] Field of Search ............... 426/573, 583, 584, 585, 426/593

[56] References Cited

U.S. PATENT DOCUMENTS

| | | | |
|---|---|---|---|
| 4,446,164 | 5/1984 | Brog | 426/585 |
| 4,479,973 | 10/1984 | Holley | 426/575 |
| 4,701,329 | 10/1987 | Nelson et al. | 426/580 |
| 4,704,292 | 11/1987 | Kattenberg | 426/584 |

OTHER PUBLICATIONS

Whistler, et al., 1973, Industrial Gums, 2nd Ed., Academic Press, N.Y. and London, pp. 104, 107.

Primary Examiner—Donald E. Czaja
Assistant Examiner—Helen Pratt
Attorney, Agent, or Firm—Gravely, Lieder & Woodruff

[57] ABSTRACT

The process for making chocolate milk and other speciality dairy drinks including mixing substantially pure lambda carrageenan, cocoa and/or other flavorings with a portion of the milk such that the lambda carrageenan has a high concentration of up to 2000 ppm, pasteurizing this mix, storing the mix, and later combining the mix with pasteurized milk prior to packaging to dilute the lambda carrageenan to about 300–600 ppm in the final product. A mixture of lambda and iota carrageenan is dissolved to suspend vegetable fat and cocoa in water in an imitation chocolate milk.

11 Claims, 1 Drawing Sheet

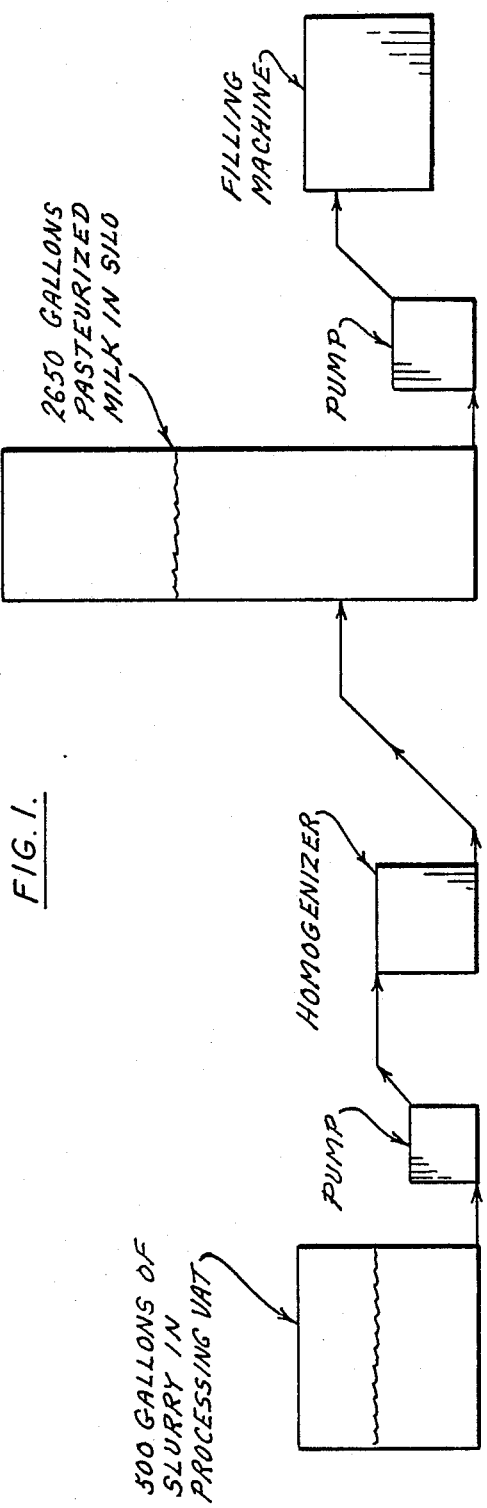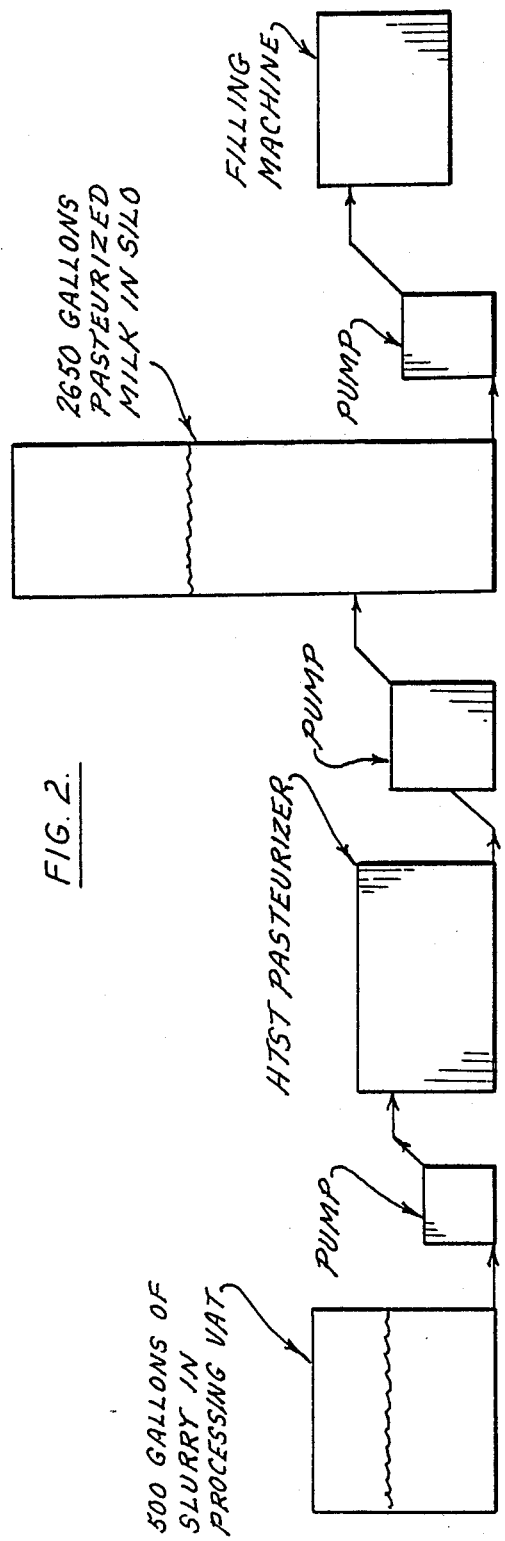

4,910,035

PROCESS AND PRODUCT FOR MAKING FLAVORED MILK

BACKGROUND OF THE INVENTION

The present invention comprises a process for making flavored milk and specifically relates to a process for making chocolate milk. In particular, this invention involves the use of substantially pure lambda carrageenan to suspend coca in milk.

A principle object of the present invention is to provide a process for making chocolate milk in which cocoa and substantially pure lambda carrageenan is mixed with a portion of the milk such that the carrageenan is at a high concentration, the portion of the milk is pasteurized and/or homogenized and then the final product is made by mixing additional homogenized milk with the initial portion to dilute the carrageenan content in the final product.

Among the advantages of the present method of making chocolate milk is that batch-type mixing of all ingredients in the proper proportions is not required until after pasteurization of a portion of the milk to achieve proper suspension of all of the cocoa. This allows small dairies which do no have the large storage facilities necessary for storing large batches of chocolate milk to make a concentrated batch of milk, cocoa and lambda carrageenan, then mix the final product by adding additional pasteurized milk as the product is needed.

The use of substantially pure lambda carrageenan allows the carrageenan to be introduced in a very concentrated form, because lambda carrageenan does not gel as does other types. The term substantially pure lambda carrageenan means that it is as pure as is presently available, i.e., 90-95 percent pure lambda carrageenan. It is desired that the lambda carrageenan be as pure as possible. Conventional carrageenan presently used in chocolate milk mixes is about 80 percent kappa carrageenan and 20 percent lambda carrageenan.

The use of lambda carrageenan also allows agitating of the chocolate milk after pasteurization without having the cocoa settle out. Using the present process, an initial concentrated slurry can be made with any fat level of milk which will allow a dairy to run one slurry and dilute it to different fat levels in a different part of the plant to avoid making several different batches of chocolate milk. The lambda carrageenan method also works with any flavored milk including egg nog.

The present method can be used with either vat or HTST (high temperature short time) pasteurization. An advantage of this process is that it allows a limited capacity dairy to increase volume without adding any new equipment. It also does not require simultaneous metering of two streams prior to pasteurization to suspend cocoa as do other slurry-type methods.

The wide spread between setting and gel with lambda carrageenan allows proper stabilization without over stabilization and separation. The final product from this process does not have a slick mouth feel.

Another object of this invention is to provide a water and vegetable fat based cocoa product which utilizes a mixture of lambda and iota carrageenan to suspend the cocoa solids. This imitation chocolate milk requires the mixture of carrageenans to hold the product together, but otherwise has all of the advantages hereinbefore set out for the use of lambda carrageenan with milk.

These and other objects and advantages will become apparent hereinafter.

This invention also consists in the parts and in the arrangements and combination of part hereinafter described and claimed.

DESCRIPTION OF THE DRAWINGS

In the accompanying drawings which form part of the specification and wherein like numerals and letters refer to like parts wherever they occur FIG. 1 is a flow sheet showing the process of this invention in a vat type batch process; and FIG. 2 is a flow sheet showing the process of this invention in a HTST process.

DETAILED DESCRIPTION

In this process, cocoa, sweeteners and lambda carrageenan are mixed with milk such that the milk has up to about 2000 ppm of carrageenan. The carrageenan used is substantially pure lambda carrageenan which does not gel at this concentration. This mixture is then pasteurized either at 160° for 20 to 30 minutes or at 170°-185° for 17 to 25 seconds. The pasteurization also activates the carrageenan.

The mixture then can be homogenized if desired. At this point the initial product can be stored in a dairy until it is ready to mix into the final concentration. In making the final consumer product, the initial product containing the cocoa and lambda carrageenan is mixed with milk that has already been pasteurized. The initial product can be diluted, either cold or while hot, and the final product then contains about 300 to about 600 parts per million of lambda carrageenan. The fat content also can be any desired level, depending on the amount and type of milk used in dilution. In many dairies the making of chocolate ilk is an inconvenience, and requires stopping other processes to make the chocolate milk. Using the present process, a single tank can contain the initial chocolate milk mix and the remainder of the milk then is metered and mixed with this mix from the regular 50,000 gallon silos which are used in other filling operations in the dairy.

Conventional carrageenan is a mixture of about 80 percent kappa and about 20 percent lambda. If conventional carrageenan were used in the concentrations defined in this process, the chocolate milk would gel and be unusable.

In the initial mix, a dry mix of ingredients can be added at one time to the milk. By weight, based on the final weight of the composition, this mix consists of 5 to about 50 percent sweeteners, preferably sucrose, about 3 to about 8 percent lambda carrageenan, and about 25 to about 75 percent cocoa. Other flavoring ingredients also can be added. These include vannillin, malt, salt and artificial flavors. These flavorings are added to or in place of some or all of the cocoa. The flavorings are in an amount from about 0.01 to about 12.0 percent by weight of the final mix.

In the final milk product which is sold to the consumer, there are about 2000 to about 6000 ppm cocoa, about 4 to about 8 percent sweeteners, and about 300 to about 600 ppm lambda carrageenan.

Following are specific examples of products made utilizing the present invention.

PRODUCT EXAMPLE #1

|  | Percent By Wt. | |
|---|---|---|
|  | Preferred | Range |
| Natural cocoa | 25.0% | 10 to 80% |
| Dutch cocoa | 25.0% | 10 to 80% |
| Lambda carageenan | 6.0% | 3 to 8% |
| Dextrose | 33.9% | 10 to 60% |
| Salt | 10.0% | 5 to 12% |
| Vanillin | 0.1% | 0.01 to 0.50% |

Process example #1 for Product #1:
(a) Place 380 gallons of milk in a process tank.
(b) Add 210 pounds of the foregoing Product No. 1.
(c) Mix for 10–20 minutes.
(d) Add 1,500 pounds of sweetener solids.
(e) Mix 15–30 minutes.
(f) Pasteurize at 185 degrees Farenheit for 15–60 seconds.
(g) Add product from the pasteurizer to a tank containing 2,650 gallons of pasteurized milk to make 3,150 gallons.
(h) Mix for 15–30 minutes.

Process example #2 for Product #1:
(a) Place 380 gallons of milk in a process tank.
(b) Add 210 pounds of the foregoing Product 1.
(c) Mix for 10–20 minutes.
(d) Add 1,500 pounds of sweetener solids.
(e) Mix for 15–30 minutes.
(f) Pasteurize at 160–170 degrees Farenheit for 20–30 minutes.
(g) Cool with a surface cooler.
(h) Add to 2,650 gallons of pasteurized milk to make 3,150 gallons.
(i) Mix for 15–30 minutes.
(j) Package the product.

Example No. 2 shows the use of this invention in the processing of an imitation chocolate milk using a water base and vegetable fat cocoa. This process requires a mixture of about 200 to about 800 parts lambda carrageenan and about 200 to about 800 parts by weight substantially pure iota carrageenan. Substantially pure iota carrageenan is about 80 to about 95 percent iota carrageenan. The mixture of carrageenans is required to keep the final product from separating.

The dry mix contains by weight about 2 to about 30 percent sweeteners, about 0.2 to about 1.5 percent lambda carrageenan, about 0.2 to about 0.8 percent iota carrageenan, about 4 to about 10 percent cocoa, about 10 to about 30 percent vegetable fat creamer, and about 20 to about 80 percent whey solids. It also contains about 0.01 to about 0.50 percent flavorings.

The final imitation milk product contains about 200 to about 600 ppm lambda carrageenan and about 100 to about 300 ppm iota carrageenan, as well as about 2000 to about 6000 ppm cocoa, about 4 to about 8 percent sweeteners and about 0.5 to about 2.5 percent vegetable fat.

PRODUCT EXAMPLE #2—IMITATION CHOCOLATE MILK

|  | Percent By Wt. | |
|---|---|---|
|  | Preferred | Range |
| Cocoa | 8.0% | 2 to 10% |
| 50% Veg. fat creamer | 20.0% | 10 to 30% |
| Whey powder | 65.0% | 40 to 80% |
| Salt | 1.30% | 0.5 to 2.5% |
| Lambda carrageenan | 0.90% | 0.2 to 1.5% |
| Iota caraageenan | 0.4% | 0.2 to 0.8% |
| Flavor | 0.05% | 0.01 to 0.50% |
| Dextrose | 4.35% | 2 to 30% |

Process example #1 for Product #2:
(a) Place 275 gallons of water in process tank.
(b) Add 1,680 pounds of Product #2.
(c) Mix 10–20 minutes.
(d) Add 1,500 pounds of sweetener solids.
(e) Mix 15–30 minutes.
(f) Pasteurize at 185 degrees Farenheit for 15–60 seconds.
(g) Add to 2500 gallons of water.
(h) Mix 15–30 minutes.
(i) Package the product.

Process example #2 for Product #2:
(a) Place 275 gallons of water in a tank.
(b) Add 1,680 pounds of Product #2.
(c) Mix 10–20 minutes.
(d) Add 1,500 pounds of sweetener solids.
(e) Mix 15–30 minutes.
(f) Pasteurize at 160–170 degrees Farenheit for 20–30 minutes.
(g) Cool with surface cooler.
(h) Add to 2,500 gallons of water.
(i) Mix 15–30 minutes.
(j) Package the product.

Example No. 3 shows the use of this invention in making egg nog. This product is made from nonfat milk solids or milk powder, whey powder and a mixture of lambda and iota carrageenan to keep the final product together. The dry mix of about 20 to about 45 percent milk powder, about 1 to about 4 percent lambda carrageenan, about 0.2 to about 1.5 percent iota carrageenan and about 40 to about 80 percent whey powder is mixed with milk or a milk cream blend, sweetener, corn syrup and egg nog flavor prior to pasteurization. The slurry is mixed with additional milk or milk cream blend to produce a final product having the desired sweeteners and fat content. The final egg nog product contains about 200 to about 800 ppm lambda carrageenan, about 100 to about 400 ppm iota carrageenan, about 8 to about 14 percent by wt. sweeteners, about 5 to about 10 percent flavoring solids, and about 2 to about 8 percent butter fat.

PRODUCT EXAMPLE #3—EGG NOG

|  | Percent By Wt. | |
|---|---|---|
|  | Preferred | Range |
| Milk powder (NFMS) | 37.2% | 20 to 45% |
| Lambda carrageenan | 2.0% | 1 to 4% |
| Iota carrageenan | 0.8% | 0.2 to 1.5% |
| Whey powder | 60.0% | 40 to 80% |

Process example #1 for Product #3:
(a) Place 300 gallons of milk or milk/cream blend in a process tank.
(b) Add 500 pounds of foregoing egg nog Product #3.

(c) Mix 10-20 minutes.
(d) Add 1,700 pounds of sweetener solids.
(e) Add 700 pounds of corn syrup.
(f) Add 200 gallons of egg nog flavor base.
(g) Mix 15-30 minutes.
(h) Pasteurize at 185 degrees Farenheit for 15-60 seconds.
(i) Add to 1,300 gallons of milk/cream mixture to produce 2,000 gallons of desired fat egg nog.
(j) Mix 15-30 seconds.
(k) Package the product.

Process example #2 for Product #3:
(a) Place 300 gallons of milk or milk/cream blend in a process tank.
(b) Add 500 pounds of foregoing egg nog Product #3.
(c) Mix 10-20 minutes.
(d) Add 1,700 pounds of sweetener solids.
(e) Add 700 pounds of corn syrup.
(f) Add 200 gallons of egg nog flavor base.
(g) Mix 15-30 minutes.
(h) Pasteurize at 160-170 degrees Farenheit for 20-30 minutes.
(i) Cool with a surface cooler.
(j) Add to 1,300 gallons of milk/cream mixture to make 2,000 gallons of desired fat egg nog.
(k) Mix 15-30 minutes.
(l) Package the product.

This invention is intended to cover all changes and modifications of the examples of the invention herein chosen for purposes of the disclosure which do not constitute departures from the spirit and scope of the invention.

What is claimed is:

1. A process for making a flavored milk comprising the steps of mixing substantially pure lambda carrageenan with flavorings and milk and pasteurizing the product.

2. The process of claim 1 wherein the lambda carrageenan is mixed with the milk at a concentration of up to 2000 ppm prior to pasteurization and thereafter diluted with additional pasteurized milk to about 300-600 ppm.

3. The process of claim 2 including the step of homogenizing the flavored milk product.

4. The process of claim 1 wherein the flavored milk product is chocolate and the flavoring is cocoa.

5. The process of claim 1 wherein the flavored milk product is egg nog nd including the step of mixing substantially pure iota carrageenan into the product.

6. A process for making imitation chocolate milk including mixing substantially pure lambda carrageenan, iota carrageenan, cocoa, vegetable fat cocoa and whey powder and water, pasteurizing the mix and adding it to additional water to produce the final composition.

7. The process of claim 6 wherein the ratio of lambda carrageenan to iota carrageenan is from about 2-3 to 1.

8. The process of claim 7 wherein the amount of lambda carrageenan in the initial mix is up to 2500 ppm and the amount of lambda carrageenan in the final product is about 200 to about 600 ppm.

9. A mix for making chocolate milk comprising about 3 to about 8 percent substantially pure lambda carrageenan, about 25 to about 75 percent cocoa and about 5 to about 50 percent sweetener, by weight based on the weight of the entire mix.

10. The product of claim 9 wherein the sweetener is sucrose.

11. The product of claim 9 including about 0.2 to about 1.5 percent substantially pure iota carrageenan, about 10 to about 30 percent vegetable fat creamer, and about 40 to about 80 percent whey solids.

* * * * *